March 3, 1970     J. P. ERTL     3,498,287
INTELLIGENCE TESTING AND SIGNAL ANALYZING MEANS AND
METHOD EMPLOYING ZERO CROSSING DETECTION
Filed April 28, 1966     5 Sheets-Sheet 1

Inventor
John P. Ertl
By Cushman, Darby & Cushman
Attorneys

March 3, 1970  J. P. ERTL  3,498,287
INTELLIGENCE TESTING AND SIGNAL ANALYZING MEANS AND
METHOD EMPLOYING ZERO CROSSING DETECTION
Filed April 28, 1966  5 Sheets-Sheet 2

John P. Ertl  Inventor
By Cushman, Darby & Cushman
Attorneys

# United States Patent Office 3,498,287
Patented Mar. 3, 1970

3,498,287
INTELLIGENCE TESTING AND SIGNAL ANALYZING MEANS AND METHOD EMPLOYING ZERO CROSSING DETECTION
John P. Ertl, Ottawa, Ontario, Canada, assignor to Neural Models Limited, Ottawa, Ontario, Canada
Filed Apr. 28, 1966, Ser. No. 546,080
Int. Cl. A61b 5/04; G01r 23/16, 27/02
U.S. Cl. 128—2.1   20 Claims

ABSTRACT OF THE DISCLOSURE

An apparatus and a method are disclosed employing a stimulative event to trigger responsive EEG signals that are analyzed by zero crossing detectors to provide a photographic readout from which the subject's response time to the event may be determined.

---

Figure 1A:
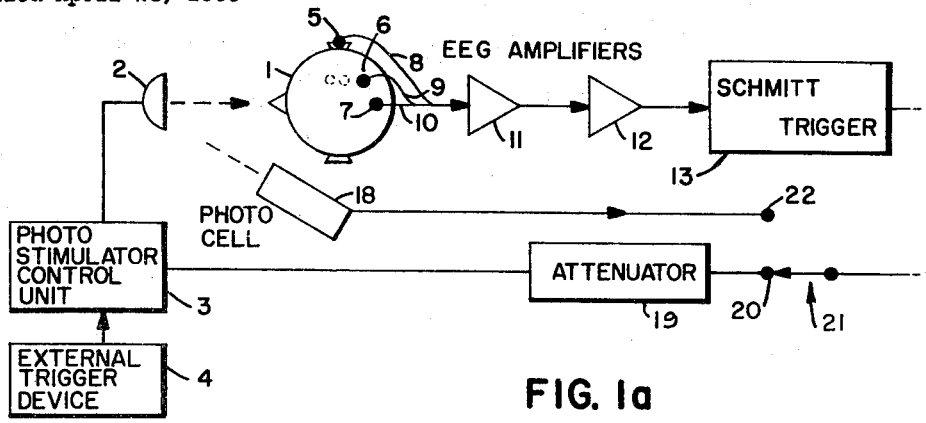

This invention relates to a method and apparatus for extracting an information signal from a composite signal also having a substantial noise component therein, such as those received in some radar systems and in brain wave analysis or electroencephalography.

In some radar systems a pulse is transmitted to a distant object, is reflected from that object and the reflected pulse is received and produces an indication on a radar display screen. However, in the case of a very weak received information signal, e.g., from a distant object, there may be so much noise present as to make it impossible to detect the received information signal. This is, of course, a considerable disadvantage and often results in the loss of valuable information.

In brain wave analysis or electroencephalography (EEG) a similar problem occurs in that it is sometimes difficult to extract the useful information from the EEG waveform due to the poor signal-to-noise ratio. The electrical potentials due to electrical brain activity from human subjects are obtainable only in greatly attenuated form because the recordings are normally made from the scalp through the skull. Thus valuable information about a patient's characteristics or behaviour may be lost which is a considerable disadvantage in electroencephalography.

Several methods have been proposed for overcoming the above-mentioned disadvantage but they are not satisfactory and/or use relatively complicated and expensive apparatus. For example, in United States Patent No. 3,087,487 (Clynes) there is disclosed a method in which the repetition rate of the pulses in a pulse train is dependent on the instantaneous amplitude of the brain waveform. However, the method there described requires the provision of a pulse modulator for the continuous examination and sampling of the brain waveform and it also has a number of disadvantages in use. It is to be noted that in the preferred embodiments of my described methods I only need to determine the zero crossing points of the brain waveform and also may use relatively inexpensive apparatus.

Other patents in this particular field include United States Patents Nos. 3,123,768 (Burch) and 3,195,533 (Fischer).

Attempts have been made in the past to assemble apparatus for assessing human intelligence utilizing previously known methods of brain wave analysis. However, such attempts have either not been successful or have had limited application possibly due to the methods of brain wave analysis used. They normally have required the provision of expensive apparatus which has also restricted the general adoption of these methods in hospitals, in industry, and in the armed services where it is often important to assess the possible intelligence of recruits on a standard IQ scale.

I have discovered that by utilizing my method of analysis I can extract from a composite signal useful information which would otherwise be lost due to the substantial noise component and poor signal-to-noise ratio.

According to my invention there is provided a method of extracting an information signal from a composite signal also having a substantial noise component therein including the step of repeatedly generating said information signal by repeatedly initiating a predetermined event, feeding the resultant composite signals in succession to a zero crossing analyzing device, Determining the zero crossing points in successive composite signals, Summating those zero crossing points in the composite signals which occur in corresponding units of time after the occurrence of said predetermined event, Comparing the resultant zero crossing summations to determine the order of magnitude thereof, and Obtaining the order of magnitude of said summations and the corresponding time interval after the occurrence of said predetermined event, The maximum zero crossing summation and corresponding time interval representing said information signal.

More specifically there is provided a method of determining the responsive of a subject to an external stimulus including the steps of attaching scalp electrodes to the head of the subject, positioning a source of illumination before the eyes of the subject, causing said source to be illuminated a plurality of times in succession to provide a plurality of patient stimuli, obtaining the resultant brain waves by means of said electrodes, determining the passages of successive individual brain waveforms through particular mathematically determinable points, summating the number of said passages for all said waveforms in corresponding units of time after the occurrence of the respective stimuli, and determining the evoked potentials corresponding to points of maxima in a graphical representation of the summated number of passage against time from the occurrence of said stimuli, said evoked potentials being indicative of the response of the subject.

The expression "mathematically determined point," as used in the present specification, will be understood to mean maxima point, minima point, or zero crossing point of a waveform.

According to another aspect of my invention I provide a method of determining the intelligence of a subject including the steps of attaching scalp electrodes to the head of the subject, positioning a source of illumination before the eyes of the subject and causing said source to be illuminated a plurality of times in succession to provide a plurality of patient stimuli, obtaining the resultant brain waveforms by means of said electrodes, determining the passages of successive individual brain waveforms through particular mathematically determinable points, summating the number of said passages for all said waveforms in corresponding units of time after the occurrence of the respective stimuli, determining the evoked potentials corresponding to points of maxima in a graphical representation of the summated number of passages against time from the occurrence of said stimuli, and comparing the time of occurrence of the evoked potentials after the stimuli with standard psychometric IQ test data to obtain an indication of the intelligence quotient of the subject.

Also according to the invention there is provided apparatus for extracting an information signal from a composite signal also having a substantial noise component therein including means for repeatedly generating said information signal by repeatedly initiating a predetermined event, a zero crossing analyzing device, means for feeding the resultant composite signals in succession to said zero crossing analyzing device, means for determining the zero crossing points in successive composite signals, means for summating those zero crossing points in the composite signals which occur in corresponding units of time after the occurrence of said predetermined event, and means for providing an indication of the respective summations for each unit of time together with the time interval between the respective unit of time and the occurrence of said predetermined event, the maximum zero crossings summation and corresponding time interval representing said information signal.

There is also provided apparatus for determining the response of a subject to an external stimulus including scalp electrodes for attachment to the head of the subject, a source of illumination positioned before the eyes of the subject, means for causing said source to be illuminated a plurality of times in succession to provide a plurality of patient stimuli, electrical connections to said electrodes for obtaining the resultant brain waves, means for determining the passage of successive brain waveforms through particular mathematically determinable points, summation means for providing the sum of the number of said passages for all said waveforms in corresponding units of time after the occurrence of the respective stimuli, and means for facilitating the determination of the evoked potentials corresponding to points of maximum in a graphical representation of the summated number of passages against time from the occurrence of said stimuli, said evoked potentials being indicative of the response of the subject.

There is also provided apparatus for determining the intelligence of a subject including scalp electrodes for attachment to the head of the subject, a source of illumination for location before the eyes of the subject, means for causing said source to be illuminated a plurality of times in succession to provide a plurality of patient stimuli, means for obtaining the resultant brain waveforms by means of said electrodes, means for determining the passages of successive individual brain waveforms through particular mathematically determinable points, summation means for summating the number of said passages for all said waveforms in corresponding units of time after the occurrence of the respective stimuli, means for determining the evoked potentials corresponding to points of maxima in a graphical representation of the summated number of passages against time from the occurrence of said stimuli, and comparison means for comparing the time of occurrence of the evoked potentials after the stimuli with standard psychometric IQ test data to obtain an indication of the intelligence quotient of the subject.

My invention will now be described, by way of example, with reference to its application to brain wave analysis or electroencephalography (EEG). However, it will be appreciated that it is not restricted thereto but has other applications, such as mentioned above.

Figure 1B:
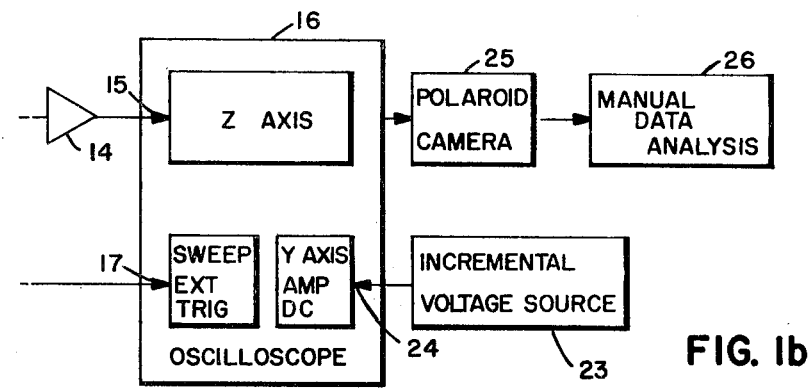
Figure 2A:
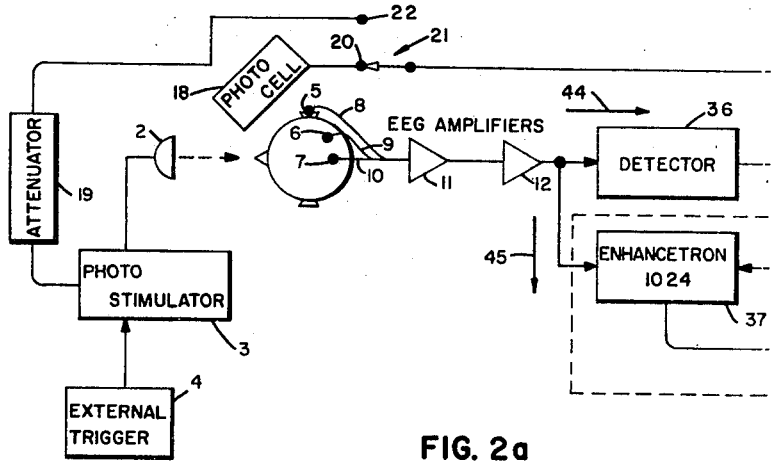
Figure 2B:
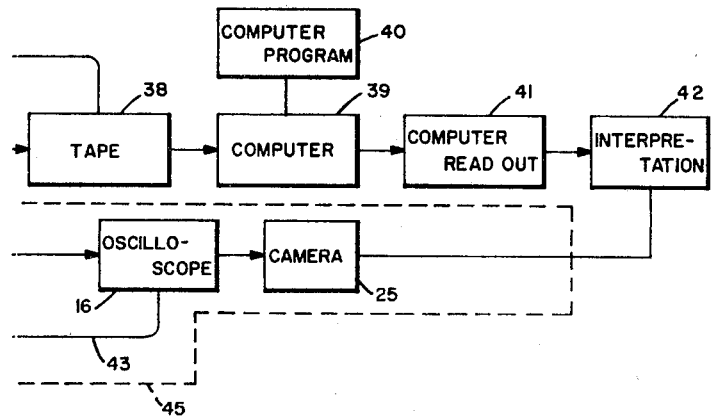
Figure 3:
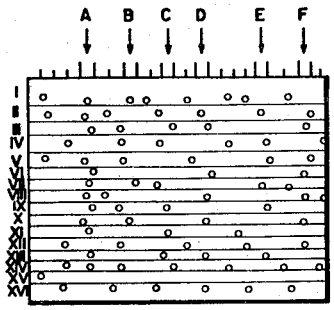
Figure 5:
Figure 4:
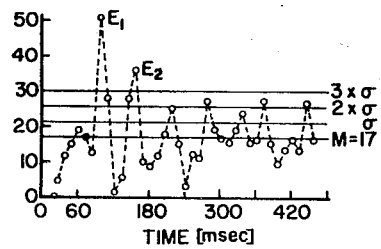
Figure 6:
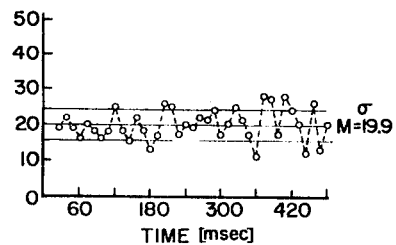
Figure 3A:
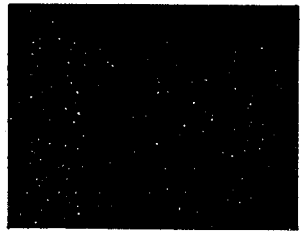
Figure 7:
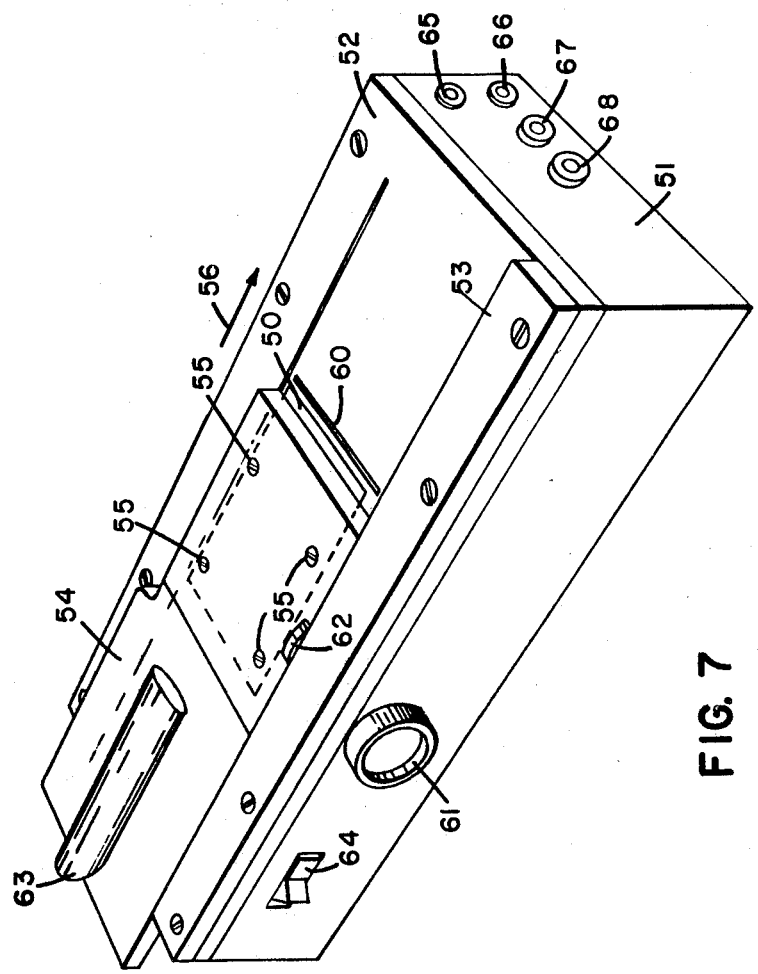

In the accompanying drawings:

FIGURE 1 comprises FIGURES 1a and 1b placed side by side and is a diagrammatic representation of apparatus according to one embodiment of my invention, FIGURE 2 comprises FIGURES 2a and 2b placed side by side and is a diagrammatic representation according to another embodiment of my invention, FIGURE 3 is a diagrammatic representation of a photographic print showing thereon dots representing zero crossings in a succession of 0.5 sec. electroencephalographs, i.e., brain waveforms, obtained from a patient's head as the result of a light stimulus, FIGURE 3a is a reproduction of the actual photographic print corresponding to FIGURE 3 showing the dots obtained for 60 brain waveforms, FIGURE 4 is a graphical representation plotting the dot count against time for the zero crossing results of FIGURE 3, FIGURE 5 is a diagrammatic representation of a photographic print showing the zero crossing dots obtained from a patient's head when no light stimulus is present, FIGURE 6 is a graphical representation of the plot of the dot count against time in the case of no light-stimulus in FIGURE 5, FIGURE 7 is a perspective view of a manually operable device which can be used to count the number of dots in a given unit of time in photographic prints such as those illustrated in FIGURES 3 and 5, and FIGURES 8 and 9 are graphical representations, similar to FIGURE 4, as obtained in one investigation.

Referring to FIGURE 1, there is shown apparatus for obtaining brain waves from the head of a patient 1 and analyzing the brain waves in accordance with the present invention to obtain useful information. Means for providing a light stimulus for the patient is provided in the form of a lamp 2 which is operable under the control of the stimulator control unit 3 and an external trigger device 4. In one arrangement the external trigger device 4 was, in fact, a push button switch operated by the investigator in charge of the investigation.

Electrodes 5, 6 and 7 are shown attached to the head of the patient 1 whereby composite signals comprising EEG and evoked potentials are applied along lines 8, 9 and 10 to a pair of series connected EEG amplifiers 11 and 12. Electrode 5 is, as shown, actually connected to the ear of patient 1 and can thus be utilized as a neutral electrode.

The EEG amplifiers are necessary because of the small magnitude of the EEG and evoked potentials obtained at the electrodes and their output is fed to the input of a Schmitt trigger unit 13, whose output is connected through an amplifier 14 to the Z-axis input terminal 15, of a cathode ray oscilloscope 16.

A synch trigger pulse is provided at the external trigger terminal 17 of the oscilloscope. This is derived either from a photo-voltaic cell 18 in response to illumination of the lamp 2 or alternatively, from a synch trigger output from the photo stimulator control unit 3 which is adapted to supply a synch pulse for each illumination of lamp 2 through an attenuator 19 to a fixed terminal 20 of a two-position switch 21. The other fixed terminal 22 of switch 21 is connected to the output of the photo-voltaic cell 18, whilst the movable arm of the switch 21 is connected to the external trigger terminal 17 of oscilloscope 16.

An incremental voltage source unit 23 is connected to the Y-axis amplifier DC input terminal 24 of oscilloscope 16.

From the above description of FIGURE 1 it will be seen that the oscilloscope 16 is so connected that its sweep is triggered at the occurrence of a stimulus for the patient 1 so that an indication of the zero crossings of the respective brain wave form, i.e. electroencephalograph waveform, is obtained on the screen of oscilloscope 16. Zero crossing points corresponding to succeeding stimuli are indicated below the zero crossing points for the immediately preceding stimulus, under the control of the incremental voltage source 23.

In the embodiment of FIGURE 1 a polaroid camera 25 is provided to photograph the zero crossing points of successive brain wave forms as displayed on the screen on the oscilloscope 16. Once a photographic print showing the zero crossing points is obtained, this is fed to a data analysis unit 26 which can be either of the manual type or the automatically operated type. It is designed to analyze the number of zero crossing points appearing on the photographic print in each unit of time either by a straight counting process or by some form of measuring mechanism such as a computer of the unit shown in FIGURE 7.

In the embodiment of the present invention shown in FIGURE 2 the same reference numerals as are used in FIGURE 1 are used to identify like parts in FIGURE 2. The electro-encephalograph waveforms are again adapted to be fed through EEG amplifiers 11 and 12 whilst switch 21 is again adapted to supply a synchronizing trigger output pulse. However, in FIGURE 2 the output of the EEG amplifier 12 is fit to a stable zero crossing detector 36, which may be of the type known as M.S.I. Model 66–1. An output from the EEG amplifier is also connected to the inport of an averaging unit 37, which may conveniently be a signal averaging digital computer manufactured by Nuclear Data, Inc., and known as the ND-800 Enhancetron-1024.

The stable zero crossing detector 36 and the averaging unit 37 can be regarded respectively as the first and second units in two parallel channels as shown in FIGURE 2. In the first channel, the output of the stable zero crossing detector unit 36 is fed to a magnetic tape recording unit 38 which is also adapted to receive the synchronizing trigger pulse from switch 21. The output of the magnetic tape recording unit 38 is supplied to a computer 39 which is controlled by a computer program unit 40 and which supplies an output via computer read-out unit 41 to an interpretation unit 42 which may be an automatic electronic unit or may alternatively include an experienced human investigator.

In the second channel the output of the averaging unit 37 is supplied to an oscilloscope unit 16 which is also connected to the averaging unit 37 through a connection 43. A camera 25 and an analysis unit 26 are also provided in this second channel, which may for convenience be identified as 45—the first channel being identified as 44. The output of the analysis unit 26 is supplied to the interpretation unit 42.

In FIGURE 3 there is shown a diagrammatic representation of the type of photographic print which could be obtained using the camera 25 in FIGURE 1. The zero crossings for 14 individual sweeps of the oscilloscope trace are identified, as I to XIV in FIGURE 3 whilst in row XVI, timing spots are shown which may be utilized in analyzing the information obtained. Time is measured along the X-axis in FIGURE 3 and in order to prepare the graphical representation such as in FIGURE 4, it is necessary to divide the time axis into a plurality of units of time. Selected units of time, i.e., equal finite time windows, are indicated as A, B, C, D and E in FIGURE 3.

In order to prepare the graphical representation of FIGURE 4 it is necessary to determine the number of zero crossing points within each unit of time in FIGURE 3. FIGURE 3 is a much simplified version of the actual photographic print obtained showing dots representing zero crossing points with stimulus—actually about 60 waveforms were obtained in one test.

In FIGURE 4 the number of zero crossing points on a photographic print have been plotted against time. It will be seen that the number of zero crossing points in the unit of time A (FIGURE 3) results in a peak $E_1$. Peak $E_2$ corresponds to the unit of time B whilst the peaks corresponding to the units of time C, D, E and F can be readily identified in FIGURE 4. Each point on the graph of FIGURE 4 corresponds to the dot count in a column 2 millimeters wide, where 2 mm. equals 12 milliseconds. It will be seen that the peaks $E_1$ and $E_2$ are in excess of the other peaks and for this reason, in addition to a comparison of the results obtained in FIGURES 5 and 6 from the same patient for no light stimulus, it can be deduced that $E_1$ and $E_2$ are non-random responses of the brain, i.e., zero crossings of the so-called evoked potentials. The time zero on the time scale of FIGURES 3 and 4 corresponds to the occurrence of the light stimulus in front of the patient and therefore the time between the occurrence of the simulus and the resultant evoked potentials can be determined by reference to the graphical representation in FIGURE 4.

In FIGURE 5, there is shown a diagrammatic representation of the photographic print obtained from the camera 25 (FIGURE 1) when brain waveforms are obtained from the patient 1 without any light stimulus being provided. FIGURE 6 is a corresponding plot of dot count against time for the zero crossing points shown in FIGURE 5. It will be seen that in FIGURE 6 the zero crossing point falls within a certain range and there are no apparent maxima points such as $E_1$ and $E_2$ of FIGURE 4 and no evoked potentials are present.

As will be understood, in order to correctly assess the information contained in FIGURE 4, it was necessary to utilize the non-stimulated response of FIGURE 6 in order to calculate the standard deviation of zero crossings. This is indicated by $\sigma$. Two or three $\sigma$ confidence bands are drawn on the plot of data, FIGURE 4, corresponding to the presence of a light stimulus. Thus a dot count that was more than two or three $\sigma$ above the means count in the "with stimulus" sample was considered to define the temporal location of a zero crossing of an evoked potential.

In FIGURE 7 there is shown a manually operable unit for examing a photograph obtained by the polaroid camera 25 of FIGURE 1 and of the type shown in FIGURE 3, to make a count of the dots representing zero crossings existing in successive units of time (i.e., time windows) in the photographs.

A prtographic print 50 is shown in position in FIGURE 7 ready for examination manually using the manual unit. The unit comprises a body 51 having a top cover 52. The top cover is provided with a guide bar 53 along one side thereof for guiding the movement of a manually slidable perspex block 54 which is provided with four screw pins 55 for holding the photographic print 50 during movement in the direction of arrow 56.

The cover 52 of the unit is provided with a narrow slit 60 and below the slit there is located a photocell unit (not shown) having appropriate connections so that it is capable of providing a voltage indicative of the zero crossing dots within any particular unit of time on the photographic print 50, when the print is over the slot 60. The voltage output of the photocell provides the Y-axis co-ordinate for the graph of FIGURES 4 and 6 and in order to obtain the X-axis co-ordinate (i.e., time) a potentiometer and battery arrangement is provided. The potentiometer knob 61 can be clearly seen in FIGURE 7 in which there is also indicated a rubber wheel 62 which is integrally mounted on the slider spindle of the potentiometer. Thus, as the slidable member 54 moves in the direction of arrow 56, its pressure on the rubber wheel 62 causes rotation of the wheel and corresponding movement of the potentiometer slider. Thus, the slider of the potentiometer moves in synchronism with the slidable member 54 and the photographic print 50. A battery is connected across the potentiometer, as will be understood, and the potentiometer supplies a voltage which is proportional to the position of the photograph with reference to the slot 60, e.g., when the photographic print 50 reaches the slot 60 the output voltage is zero but this voltage increases as the succeeding strips of the photograph are over the slot 60 until when the last strip of the photograph is over the slot 60, then the output voltage of the potentiometer is a maximum. In this way, the voltage output from the potentiometer may be utilized to identify the relative time position of any particular dot count since the rubber wheel 62 moves in synchronism with the slidable member 54. Thus, graphs such as those shown in FIGURES 4 and 6 can be readily prepared.

The slidable perspex member 54 is provided with a convenient handle 63, an ON-OFF switch 64 is provided on the body 51, which also includes terminals 65 to 68 for obtaining the electrical outputs of the photocell unit and the voltage from the potentiometer/rubber wheel arrangement.

To use the embodiment of my invention as shown in FIGURE 1, the patient sits in a suitable position in front of the source of illumination, lamp 2, and I attach the electrodes 5, 6 and 7 to the appropriate parts of his head.

I have found that if I wish to assess the intelligence of an individual a very convenient location for the sensing electrodes 6 and 7 is on top of the head in the motor area of the brain as shown in FIGURE 1 by the dotted circles on the head of the subject 1. However, it will be appreciated that other parts of the body may be used depending on the information required and also in accordance with experience.

With the patient in position I then promote a succession of stimuli by illuminating the lamp 2 at suitable intervals. This I do by operating the external trigger device 4 by means of the push button, allowing sufficient time between succeeding stimuli to permit conditions to return to normal and for the results to be recorded by the polaroid camera 25. The switch 21 is of course previously set to either the fixed contact 20 or the fixed contact 22 in order that the required synchronizing trigger output pulse is obtained and supplied to the terminal 17 of the oscilloscope 16. This synchronizing trigger pulse initiates a sweep of the oscilloscope trace and thus any output from the amplifier 14 is displayed on the screen of the oscilloscope in its correct time relationship to the occurrence of the corresponding stimulus from lamp 2.

The sensing electrodes 5, 6 and 7 detect the small voltages corresponding to the brain activity and these are applied to the EEG amplifiers 11 and 12. The output of the amplifier 12 is applied to the Schmitt trigger device 13 which responds to the passage of the input waveform substantially through zero, i.e., the points of maximum slope in the brain waveform or electro-encephalograph waveform. The Schmitt trigger 13 supplies a fast-rise leading edge voltage for each passage of the brain waveform through zero and the fast-rise voltages are applied through the amplifier 14 to the Z-axis terminal 15 (intensity) of the oscilloscope 16 and thus a bright spot or dot is produced on the oscilloscope screen. A similar bright dot is produced for each passage of the brain waveform through zero as detected by the Schmitt trigger circuit 13. Thus there is obtained on the oscilloscope screen a line of bright dots corresponding to the zero crossing point of the brain waveform with stimulus. The polaroid camera 25 records this line of bright dots for future use. As the Z-axis input of the oscilloscope used by me responded only to negative voltages, only the negative going past of the Schmitt output intensified the trace i.e., produced the dots.

Before the next stimulus is applied by the lamp 2, the operator ensures that a voltage has been applied to the terminal 24 so that the Y-axis voltage has changed so that the next trace of the oscilloscope is spaced from the previous one so that the next line of bright dots on the screen will not be confused with the previous line of bright dots. The incremental voltage source 23 may be a voltage divider arrangement for supplying a suitable DC voltage and its operation may be manual under the control of the operator, i.e., the succeeding steps of the voltage divider may be selected by a knob so that voltages of increasing or decreasing magnitude are applied in succession to the Y-axis terminal 24 corresponding to succeeding illuminations of the lamp 2.

After the operator, i.e., investigator, has selected the next voltage stop for the incremental voltage source 23, he operates the push button so that the external trigger device 4 and the photo stimulator control unit 3 cause the lamp 2 to be illuminated again. Thus a further brain waveform as a result of a stimulus is obtained and the resulting zero crossing bright dots are recorded on the screen of the oscilloscope 16 and are photographed by the camera 25. Thus after a plurality of illuminations of the lamp 2, the camera 25 has recorded a plurality of lines of bright dots, each line being displaced below the previous one by a distance determined by the incremental voltage source 23. A photographic print is obtained from the camera 25 and this is analyzed, for example, by means of the manual unit of FIGURE 7—this may be regarded as a photo integrator device. The protographic print from the camera 25 is placed face downwards under the slidable perspex member 54 (FIGURE 7)—in practice I have found that it does not matter whether the photographic print is face upwards or face downwards. The photographic print is attached to the pins 55 so that there can be no relative movement between the photographic print 50 and the slidable member 54. The terminals 65 to 68 are connected to suitable recording apparatus and the potentiometer knob 61 is set so that the rubber wheel 62 may rotate in synchronism with the movement of the slidable perspex member 54.

The switch 64 is then switched on to complete all the electrical circuits and the slidable perspex member 54 is moved in the direction of arrow 56 by means of the handle 63. In this way the photographic print 50 is moved across the slot 60 and the amount of light from a lamp (not shown), previously positioned above the full unit of FIGURE 7, is varied in accordance with the number of zero crossing dots present in that portion of the photograph which is above the slot 60. The light from the lamp (not shown) actually passes through the perspex member 54 through the photograph, through the slot and thus onto the photoelectric device within the body 51.

The output from the photocell within the body 51 and the output from the potentiometer associated with knob 61 are supplied to suitable indicating or measuring devices and from these the graph of FIGURE 4 is obtained showing the zero crossing dots with stimulus plotted against time.

In order to obtain the waveform without light stimulus as in FIGURES 5 and 6, a synch trigger pulse but no light stimulus from the lamp 2 is provided and the brain waveforms from the patient are obtained and recorded by the camera 25. These are then analyzed using the manual unit of FIGURE 7 or an equivalent automatic unit, and the results are plotted to obtain a graphical representation such as in FIGURE 6.

The embodiment of the invention shown in FIGURE 2 is similar in many respects to the embodiment shown in FIGURE 1 but it will be seen that this utilizes, in a first channel 44, a magnetic tape recording system 38 and a computer 41 to analyze the zero crossing dots obtained from the successive brain waveforms. As a cross check, FIGURE 2 also includes a second channel 45 utilizing a camera 25 to obtain a record as obtained in FIGURE 1. Whilst this second channel is not essential it will be appreciated that it may be of interest in any detailed study of a patient.

The use of the computer and associated units of FIGURE 2 obviously reduces the time necessary to examine a patient, as well as the amount of human effort involved.

By looking at the graphical representation of the zero crossing dot count with stimulus, FIGURE 4, it is possible to say that the evoked potentials $E_1$ and $E_2$ occurred at a particular time after the occurrence of the stimuli. I have discovered that the time delay in substantially constant for the same individual and that the time delay of the late components of the evoked potentials, e.g., after $E_1$ and after $E_2$ of FIGURE 4, can be utilized to obtain the intelligence of the patient under examination. I have examined a large number of individuals by my method and have also subjected those same individuals to a standard IQ test. I have tabulated the time delay of their respective evoked potentials against their IQ on the standard scale and have by this means produced graphs of the evoked potential time delays against IQ. Thus if I am called upon to determine the intelligence of a new patient, I subject him to analysis by my method in accordance with either FIGURE 1 or FIGURE 2, obtain a plot of zero crossing dot count with stimulus, as in FIGURE 4. I then determine his evoked zero crossing time delay and, by comparison with my chart of standard data, psychometric IQ test data, I can predict his IQ. The advantage of this method would seem to be that it is a neuro-physiological measurement of the person's intelligence and is independent of that particular person's familiarity with the standard IQ tests.

In my research on the relationship between brainwaves and psychological variables, including human intelligence, I repeat that I have concluded that there is a relationship between the latency of components of the evoked potentials and intelligence. The late components of the evoked potentials are believed to be the electrical signs of information processing or associative activity in the brain it is reasonable to postulate that a biologically efficient organism should process information more rapidly than a less efficient organism and that the delay of components of the evoked potentials is a measure of the efficiency of this process. In one of my investigations, the results consisted of an analysis of data obtained from 33 post-graduate students with IQ's in the superior range, 11 army cadets with I.Q.'s in the low average range, and 4 mentally retarded subjects with IQ's ranging from 50 to 65. The age of the entire sample ranged from 17 to 41 years, the average being 28 years. The stimulus was a number of short duration bright flashes of light (Grass P5 Photostimulator) presented at random intervals. The EEG was derived from bipolar electrodes over the left motor area of each subject. The motor area was chosen with the idea of maximizing the input-output delay and thus to enhance the possibility of actually measuring central processing time. Evoked potentials were detected and analyzed by my technique of zero crossing analysis. In this technique baseline crossings of the EEG following 120 stimuli were detected and displayed in photographs similar to that in FIGURE 3. Baseline crossing (dots) with and without stimulus were counted in intervals of 12 ms. If the count is any interval (with stimulus) exceeded the count expected by chance, that is when no stimulus was present, then an evoked potential was considered to be present in that interval. The period of analysis was 0.5 sec. following the stimuli and in this epoch five components of the evoked potentials were detected in most subjects. The latency of these components was measured for each subject. For the purposes of this explanation, the term evoked potential is used for convenience but it will be understood as really applying to the zero crossing of the evoked potentials.

Figure 8:
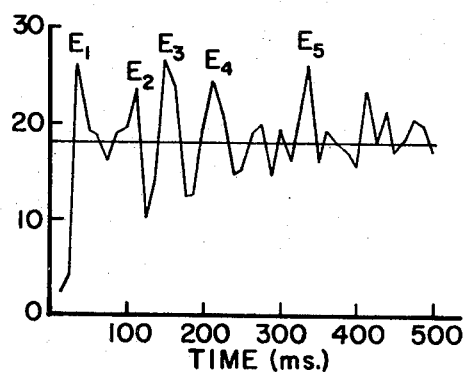
Figure 9:
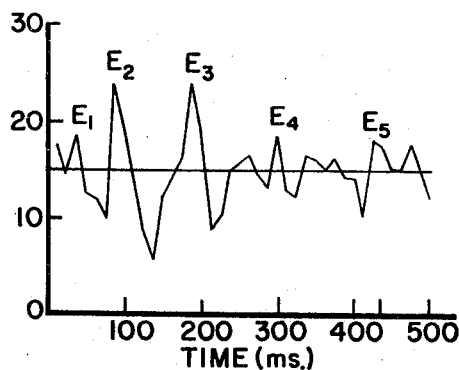

An analysis of photographic prints showing the zero-crossing dots for one high IQ subject and one average IQ subject is shown in FIGURES 8 and 9, and it is evident by inspection that starting with E3 the high subject has substantially shorter latencies in the late components of the evoked potentials than the average IQ subject. There is no difference in the early components $E_1$, $E_2$. This trend continues for the entire sample and a statistical analysis is presented in the following table.

| Intelligence | Latency, ms. | U | z | p |
|---|---|---|---|---|
| High E1 vs. Low E1 | 47–42 | 24 | 0.467 | .3228 |
| High E2 vs. Low E2 | 90–102 | 53 | 0.189 | .4247 |
| High E3 vs. Low E3 | 142–205 | 0 | 4.000 | [2] .0003 |
| High E4 vs. Low E4 | 223–278 | 4 | | [2] .0100 |
| High E5 vs. Low E5 | 302–374 | 26 | 1.670 | [1] .0475 |
| High E1 vs. Average E1 | 47–52 | 31 | | .1867 |
| High E2 vs. Average E2 | 90–89 | 153 | 0.533 | .2981 |
| High E3 vs. Average E3 | 142–175 | 22 | 1.110 | .1335 |
| High E4 vs. Average E4 | 223–241 | 27 | 1.910 | [1] .0287 |
| High E5 vs. Average E5 | 302–362 | 0 | 4.000 | [2] .0003 |
| Average E1 vs. Low E1 | 52–42 | 7 | | .5000 |
| Average E2 vs. Low E2 | 89–102 | 16 | 0.676 | .2510 |
| Average E3 vs. Low E3 | 177–205 | 7 | 1.900 | [1] .0287 |
| Average E4 vs. Low E4 | 242–279 | 42 | | [1] .0330 |
| Average E5 vs. Low E5 | 362–374 | 12 | | .1000 |

The mean latency scores for each component of the evoked potentials E1–E5 for the three groups are compared by the Mann-Whitney U Test.
[1] $p<.05$, [2] $p<.01$.

The Mann-Whitney U test for the significance of differences between means was used as all conditions for the application of this nonparametric "t" test were satisfied by the data. It was possible to retest nine subjects (unfortunately all from the High IQ group) and the latencies measured weer all within the error of measurement (plus or minus 6 ms.) of this technique in its present form. The investigation indicated that high psychometric intelligence may be associated with short delays in the later components of the evoked potentials.

In a further experimental arrangement the instrumentation used was a Hewlett Packard Frequency Meter model 500BR which has a Schmitt trigger circuit, was fired by a 0.2 v. signal and had a 35 v. negative output pulse for each cycle of input. The trace was indented after each sweep by applying DC to the input of the CRO from a decade voltage divider.

The EEG amplifier gain was adjusted so that a $3\mu$ v. signal would produce a pulse. The CRO sweep was randomly triggered by a photostimulator and the EEG obtained from bipolar electrodes over the motor area. It is important to note that it is necessary to indicate the beginning of the sweep (solid line FIG. 1, $a$, $c$) as a zero crossing will not always occur when the sweep is triggered by the stimulus.

ANALYSIS OF DATA (a) A sheet of perspex on which parallel lines at 2 mm. intervals were ruled, was placed over the photograph and the dots in each column were counted. A plot of dot count versus time was made for the data with stimulus and for the data without stimulus.

(b) The standard deviation of zero crossings was then calculated for the non stimulated sample.

(c) Two and three $\sigma$ confidence bands were drawn on the plot of data with stimulus. Thus a dot count that was more than $3\sigma$ above the mean count in the "with stimulus" sample was considered to define the temporal location of a zero crossing of an evoked potential.

(d) Once the zero crossings of the evoked potentials are statistically identified and located in time, the method can be refined by reducing the width of the time interval used. This procedure serves to increase the resolution of the latency measurements.

RESULTS AND DISCUSSION

The distribution of zero crossings with no stimulus and the eyes open was found to approximate closely the gaussian distribution for the data reported in this paper and also for the data obtained from 50 other subjects. Statistics based on this distribution were therefore used. Other distributions are possible in which case appropriate statistics must be used to decide what is an event. In general, providing the stimulus is randomly applied, only those events (zero crossings) which are time locked to the stimulus will summate sufficiently in any small time interval to reach the criterion of 2–3$\sigma$ above the mean count, regardless of the characteristics of the background noise.

The technique will answer the question: is there a non-random event present at time T after the stimulus or not? The analysis is not as tedious as it appears, less than 2$h$ per subject being generally sufficient. The pulses can be recorded on any two track tape recorder and the analysis done by a computer. Data can also be played back into the oscilloscope from the tape, and photographs made at leisure after the subjects have gone.

It will be seen from the above that by using my zero crossing technique, I avoid any ambiguity due to any noise which does not cross the zero line but is, for example, on a peak of the waveform.

It will be appreciated that by using my method of analysis and one of the embodiments described above a relatively inexpensive analysis system may be constructed.

I claim:

1. A method of extracting an information signal from a composite signal also having a substantial noise component therein including the step of repeatedly initiating a predetermined event to repeatedly generate said information signal, feeding the resultant composite signals in succession to a zero crossing analyzing device, determining the zero crossing points in successive composite signals, summating those zero crossing points in the composite signals which occur in corresponding units of time after the occurrence of said predetermined event, comparing the resultant zero crossing summations to determine the order of magnitude thereof, and obtaining the order of magnitude of said summations and the corresponding time interval after the occurrence of said predetermined event, the maximum zero crossing summation and corresponding time interval representing said information signal.

2. A method of determining the response of a subject to an external stimulus including the steps of attaching scalp electrodes to the head of the subject, positioning a source of illumination before the eyes of the subject, causing said source to be illuminated a plurality of times in succession to provide a plurality of subject stimuli, obtaining the resultant brain waves by means of said electrodes, determining the passages of successive individual brain waveforms through particular mathematically determinable points, summating the number of said passages for all said waveforms in corresponding units of time after the occurrence of the respective stimuli, and determining the evoked potentials corresponding to points of maxima in a graphical representation of the summated number of passages against time from the occurrence of said stimuli, said evoked potentials being indicative of the response of the subject.

3. A method according to claim 2 in which the determining of the pasages of successive individual brain waveforms through particular mathematically determinable points is the determining of the zero crossing points of successive individual waveforms.

4. A method according to claim 3 wherein said steps include displaying dots corresponding to said zero crossing points of substantially all said waveforms on the screen of an oscilloscope, counting the number of dots displayed on said oscilloscope in selected units of time after the occurrence of said stimuli, the displayed dots in said units being each within a particular time interval after the occurrence of the corresponding subject stimuli, graphically representing the number of dots in each unit against the respective time of the unit from the occurrence of the subject stimuli, and examining the resultant graphical representation to determine the evoked potentials corresponding to said stimuli, said evoked potentials being represented by the peaks in the graphical representation and being indicative of the response of the subject.

5. A method according to claim 4 including the steps of applying said brain waves to a Schmitt trigger device to determine said zero crosing points.

6. A method according to claim 3 wherein said steps include detecting the zero crossing points of successive individual waveforms, feeding a voltage corresponding to each zero crossing point to a tape recording system, supplying the information recorded on said tape to a computer device capable of counting the number of dots on said tape in selected units of time after the occurrence of said stimuli, the counted dots in said being each within a particular time interval after the occurrence of the corresponding subject stimuli, determining the number of dots in each unit and the time relationship of the unit to the occurrence of the subject stimuli, and determining the evoked potentials corresponding to said stimuli, said evoked potentials being represented by the maximum number recorded on said tape and being indicative of the response of the subject.

7. A method of determining the intelligence of a subject including the steps of attaching scalp electrodes to the head of the subject, positioning a source of illumination before the eyes of the subject and causing said source to be illuminated a plurality of times in succession to provide a plurality of patient stimuli, obtaining the resultant brain waveforms by means of said electrodes, determining the passages of successive individual brain waveforms through particular mathematically determinable points, summating the number of said passages for all said waveforms in coresponding units of time after the occurrence of the respective stimuli, determining the evoked potentials corresponding to points of maxima in a graphical representation of the summated number of passages against time from the occurrence of said stimuli, and comparing the time of occurrence of the evoked potentials after the stimuli with standard psychometric I.Q. test data to obtain an indication of the intelligence quotient of the subject.

8. A method according to claim 7 in which the determining of the passages of successive individual brain waveforms through particular mathematically determinable points is the determining of the zero crossing points of successive individual waveforms.

9. A method according to claim 8 wherein said steps include displaying zero crosing points of said waveforms on the screen of an oscilloscope, counting the number of zero crossing points displayed on said oscilloscope in selected units of time after the occurrence of said stimuli, the displayed zero crossing points in said units being each within a particular time interval after the occurrence of the corresponding patient stimuli, graphically representing the number of zero crossing points in each unit against the respective time of the unit from the occurrence of the patient stimuli, and comparing the resultant graphical representation with standard data to obtain an indication of the intelligence quotient of the subject.

10. Apparatus for extracting an information signal from a composite signal also having a substantial noise component therein including means for repeatedly generating said information signal by repeatedly initiating a predetermined event, a zero crossing analyzing device, means for feeding the resultant composite signals in succession to said zero crossing analyzing device, means for determining the zero crossing points in successive composite signals, means for summating those zero crossing points in the composite signals which occur in corresponding units of time after the occurrence of said predetermined event, and means for providing an indication of the respective summations for each unit of time together with the time interval between the respective unit of time and the occurrence of said predetermined event, the maximum zero crossing summation and corresponding time interval representing said information signal.

11. Apparatus for determining the response of a subject to an external stimulus including scalp electrodes for attachment to the head of the subject, a source of illumination adapted to be positioned before the eyes of the subject, means for causing said source to be illuminated a plurality of times in succession to provide a plurality of patient stimuli, electrical connections to said electrodes for obtaining the resultant brain waves, means for determining the passage of successive brain waveforms through particular mathematically determinable points, summation means for providing the sum of the number of said passages for all said waveforms in corresponding units of time after the occurrence of the respective stimuli, and means for facilitating the determination of the evoked potentials corresponding to points of maximum in a graphical representation of the summated number of passages against time from the occurrence of said stimuli, said evoked potentials being indicative of the response of the subject.

12. Apparatus according to claim 11 wherein the means for determining the passages of successive brain waveforms through particular mathematically determinable points, in operation, is effective to determine the zero crossing points of successive individual waveforms.

13. Apparatus according to claim 12 including an oscilloscope, means for displaying dots corresponding to said zero crossing points of substantially all said waveforms on the screen of said oscilloscope, counting means for counting the number of dots displayed on said oscilloscope in selected units of time after the occurrence of said stimuli, the displayed dots in said units being each within a particular time interval after the occurrence of the corresponding subject stimuli, means for graphically representing the number of dots in each unit against the respective time of the unit from the occurrence of the subject stimuli to permit examination of the resultant graphical representation to determine the evoked potentials corresponding to said stimuli, said evoked potentials being represented by the peaks in the graphical representation and being indicative of the response of the subject.

14. Apparatus according to claim 13 including a Schmitt trigger device, and means for applying said brain waves to said Schmitt trigger device to determine said zero crossing points.

15. Apparatus according to claim 12 including means for detecting the zero crossing points of successive individual waveforms, a tape recording system, means for feeding a voltage corresponding to each zero crossing point to said tape recording system to produce corresponding recorded pulses on the tape thereof, a computer device, means for supplying the information recorded on said tape to said computer device capable of counting the number of pulses on said tape in selected units of time after the occurrence of said stimuli, the counted pulses in said units being each within a particular time interval after the occurrence of the corresponding subject stimuli, means for determining the number of pulses in each unit and the time relationship of the unit to the occurrence of the subject stimuli, and means for determining the evoked potentials corresponding to said stimuli, said evoked potentials being represented by the maximum number recorded on said tape and being indicative of the response of the subject.

16. Apparatus for determining the intelligence of a subject including scalp electrodes for attachment to the head of the subject, a source of illumination adapted for location before the eyes of the subject, means for causing said source to be illuminated a plurality of times in succession to provide a plurality of patient stimuli, means for obtaining the resultant brain waveforms by means of said electrodes, means for determining the passages of successive individual brain waveforms through particular mathematically determinable points, summation means for summating the number of said passages for all said waveforms in corresponding units of tie after the occurence of the respective stimuli, means for determining the evoked potentials corresponding to points of maxima in a graphical representation of the summated number of passages against time from the occurrence of said stimuli to permit the comparison of the time of occurrence of the evoked potentials after the stimuli with standard psychometric I.Q. test data to obtain an indication of the intelligence quotient of the subject.

17. Apparatus according ot claim 16 wherein the means for determining of the passages of successive individual brain waveforms through particular mathematically determinable points, in operation, is effective to determine the zero crossing points of successive individual waveforms.

18. Apparatus according to claim 17 including an oscilloscope, means for displaying dots corresponding to zero crossing points of said waveforms on the screen of said oscilloscope, counting means for counting the number of dots displayed on said oscilloscope in selected units of time after the occurrence of said stimuli, the displayed dots in said units being each within a particular time interval after the occurrence of the corresponding subject stimuli, means for graphically representing the number of dots in each unit against the respective time of the unit from the occurrence of the subject stimuli to permit the comparison of the resultant graphical representation with standard psychometric I.Q. test data to obtain an indication of the intelligence quotient of the subject.

19. Apparatus according to claim 18 including a Schmitt trigger device, and means for applying said brain waves to said Schmitt trigger device to determine said zero crossing points.

20. Apparatus according to claim 17 including means for detecting the zero crossing points of successive individual waveforms, a tape recording system, means for feeding a voltage corresponding to each zero crossing point to said tape recording system, a computer device, means for supplying the information recorded on said tape to a computer device capable of counting the number of dots on said tape in selected units of time after the occurrence of said stimuli, the counted dots in said units being each within a particular time interval after the occurrence of the corresponding subject stimuli, means for determining the number of dots in each unit and the time relationship of the unit to the occurrence of the subject stimuli, and means for determining the evoked potentials corresponding to said stimuli to permit the obtaining of an indication of the intelligence of the subject.

References Cited

UNITED STATES PATENTS

| | | |
|---|---|---|
| 2,648,822 | 8/1953 | Walter. |
| 2,760,105 | 8/1956 | Michaels _____ 128—2.1 XR |
| 2,860,627 | 11/1958 | Harden et al. _____ 128—2.1 |
| 3,172,404 | 3/1965 | Copenhaver et al. __ 128—2.1 |
| 3,413,546 | 11/1968 | Riehl et al. |

WILLIAM E. KAMM, Primary Examiner

U.S. Cl. X.R.

324—77